United States Patent
Kim et al.

(10) Patent No.: US 9,184,893 B2
(45) Date of Patent: Nov. 10, 2015

(54) BACKHAUL LINK SUBFRAME STRUCTURE IN MOBILE COMMUNICATION SYSTEM AND METHOD FOR TRANSMITTING INFORMATION THEREOF

(75) Inventors: Hakseong Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 107 days.

(21) Appl. No.: 14/007,592

(22) PCT Filed: Mar. 23, 2012

(86) PCT No.: PCT/KR2012/002149
§ 371 (c)(1),
(2), (4) Date: Sep. 25, 2013

(87) PCT Pub. No.: WO2012/134123
PCT Pub. Date: Oct. 4, 2012

(65) Prior Publication Data
US 2014/0016541 A1    Jan. 16, 2014

Related U.S. Application Data

(60) Provisional application No. 61/467,384, filed on Mar. 25, 2011.

(51) Int. Cl.
*H04W 4/00* (2009.01)
*H04L 5/00* (2006.01)
*H04W 56/00* (2009.01)
(Continued)

(52) U.S. Cl.
CPC ............ *H04L 5/0058* (2013.01); *H04L 5/0044* (2013.01); *H04L 5/0053* (2013.01); *H04L 27/2602* (2013.01); *H04W 56/004* (2013.01);
(Continued)

(58) Field of Classification Search
CPC ... H04L 5/0058; H04L 5/0044; H04L 5/0053; H04L 27/2602; H04W 56/004; H04W 84/047; H04B 7/15507
See application file for complete search history.

(56) References Cited

U.S. PATENT DOCUMENTS

2011/0170436 A1* 7/2011 Doan et al. ................. 370/252
2012/0002591 A1* 1/2012 Noh et al. ................... 370/315
(Continued)

FOREIGN PATENT DOCUMENTS

KR    20100093503 A    8/2010
WO    2010031439 A1    3/2010
(Continued)

OTHER PUBLICATIONS

LG Electronics Inc.: "Further Comments on DL/UL Timing Alternatives", 3GPP DRAFT; R1-101363, Feb. 2010.*
(Continued)

*Primary Examiner* — Clemence Han
(74) *Attorney, Agent, or Firm* — Dentons US LLP

(57) ABSTRACT

The present invention relates to a method for a first node to transmit a signal to a second node in a mobile communication system, and comprises the steps of: determining a first slot setting and a second slot setting according to propagation delay value between the first node and the second node; and transmitting the signal through a subframe having a structure determined by the first slot setting and the second slot setting, wherein the first slot setting and the second slot setting each includes a initiation symbol and a termination symbol determined in consideration of the propagation delay value.

13 Claims, 18 Drawing Sheets

(51) Int. Cl.
  *H04L 27/26* (2006.01)
  *H04J 3/08* (2006.01)
  *H04W 84/04* (2009.01)
  *H04B 7/155* (2006.01)

(52) U.S. Cl.
  CPC .......... *H04B 7/15507* (2013.01); *H04W 84/047* (2013.01)

(56) References Cited

U.S. PATENT DOCUMENTS

| 2012/0039239 A1* | 2/2012 | Park et al. | 370/315 |
| 2012/0320819 A1* | 12/2012 | Kim et al. | 370/315 |
| 2013/0010676 A1* | 1/2013 | Kim et al. | 370/315 |

FOREIGN PATENT DOCUMENTS

| WO | 2010095883 A2 | 8/2010 |
| WO | 2010095887 A2 | 8/2010 |
| WO | 2010117208 A2 | 10/2010 |
| WO | 2010120124 A2 | 10/2010 |
| WO | 2011019223 A2 | 2/2011 |

OTHER PUBLICATIONS

LG Electronics inc: "Further comments on DL/UL timing alternatives", 3GPP DRAFT; R1-101363 comments on timing alternatives_Ige, 3rd Generation Partnership Project (3GPP), Mobile Competence Centre; 650, Route Des Lucioles; F-06921 Sophia-Antipolis Cedex; France, Feb. 19, 2010, XP050598097.

Catt et al: "Design of relay frame timing in LTE-A", 3GPP DRAFT; R1-101774, 3rd Generation Partnership Project (3GPP), Mobile Competence Centre; 650, Route Des Lucioles; F-06921 Sophia-Antipolis Cedex; France, vol. Ran WG1, no. Beijing, china; 20100412, Apr. 6, 2010, XP050419183.

Panasonic: "DL backhaul starting timing of R-PDCCH and R-PDSCH", 3GPP DRAFT; R1-102880, 3rd Generation Partnership Project (3GPP), Mobile Competence Centre; 650, Route des Lucioles; F-06921 Sophia-Antipolis Cedex; France, vol. RAN WG1, no. Montreal, Canada; 20100510, May 4, 2010, XP050420027.

* cited by examiner

FIG. 12
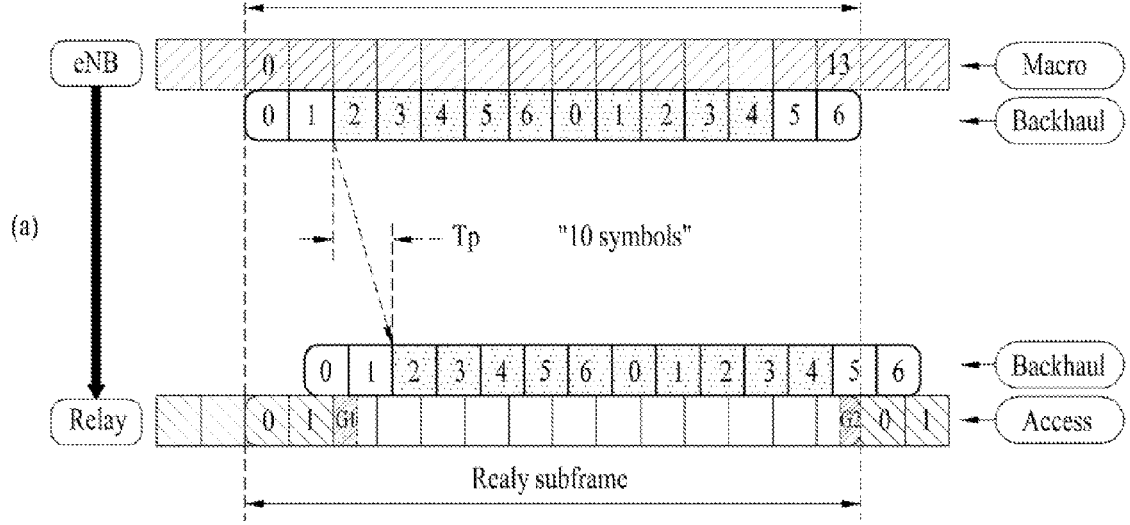
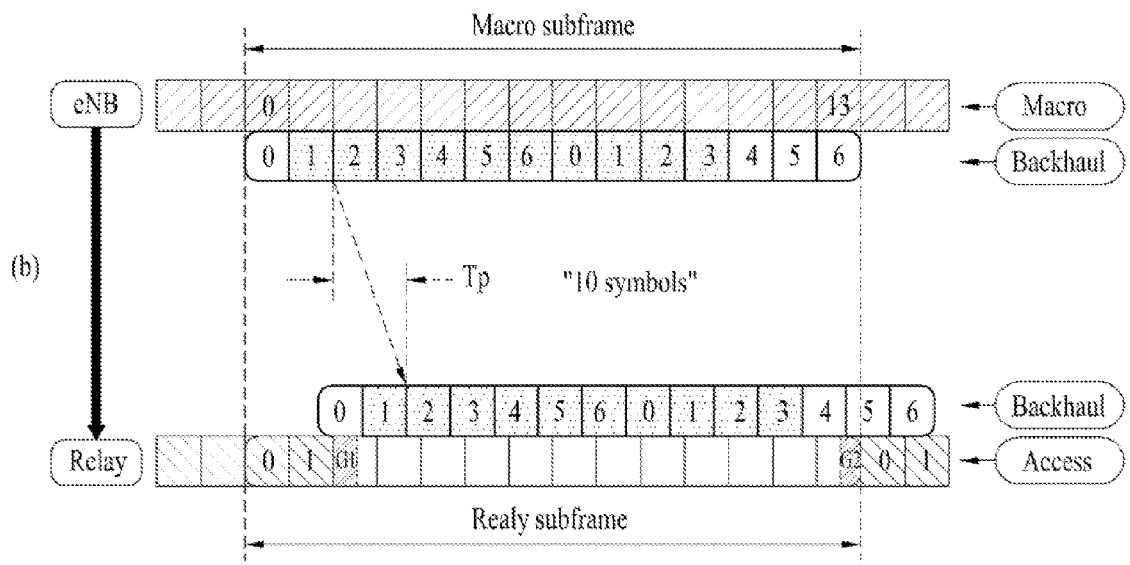

FIG. 16
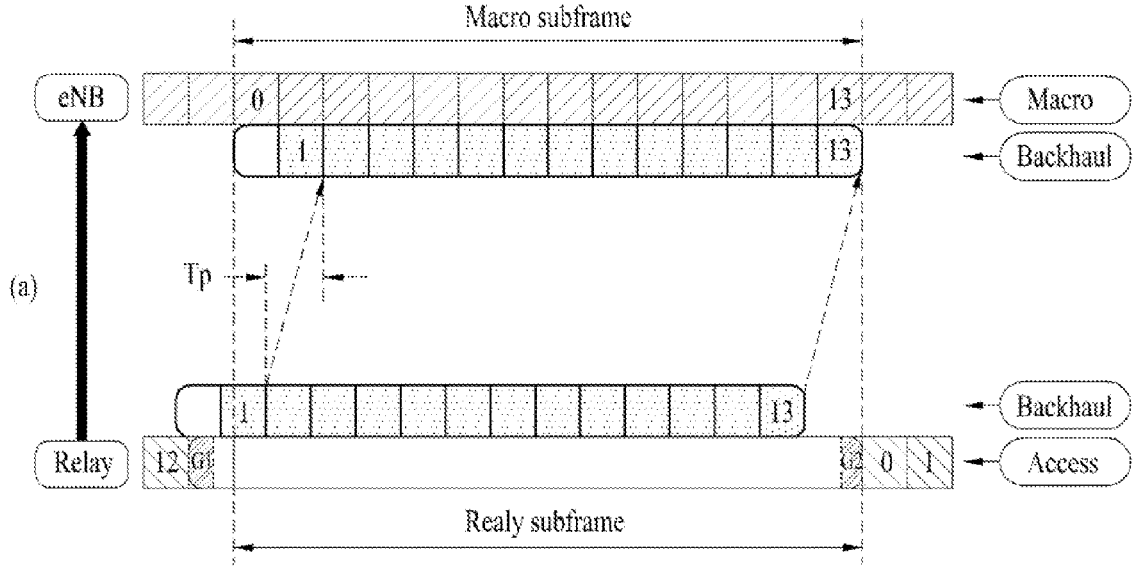
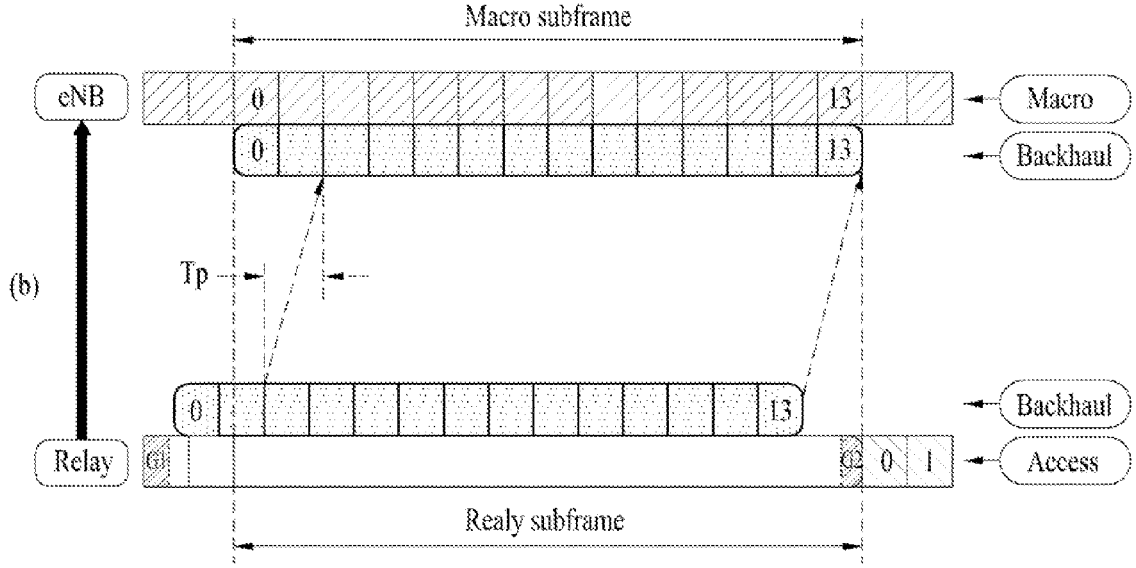

FIG. 17
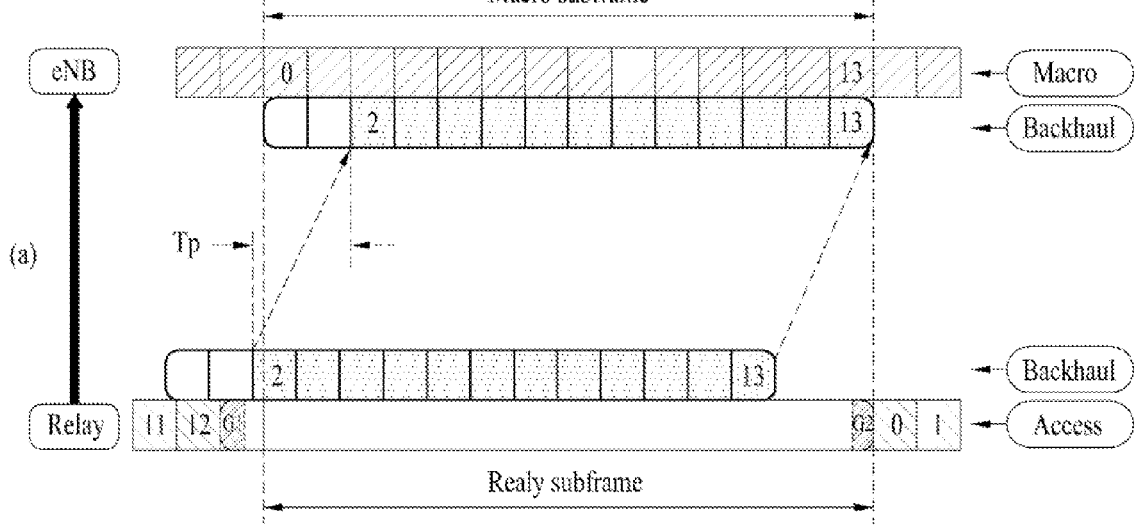
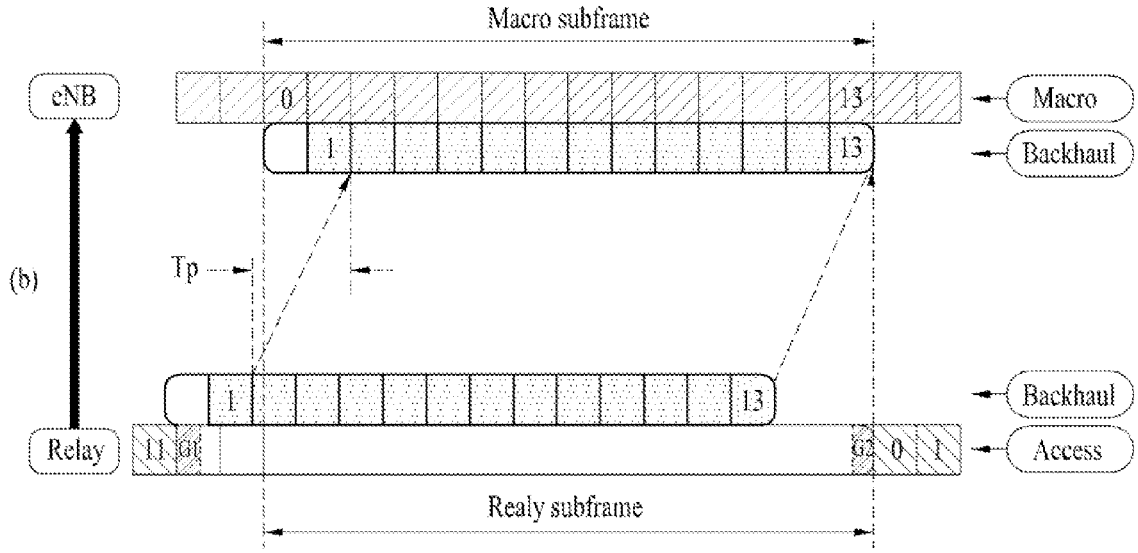

BACKHAUL LINK SUBFRAME STRUCTURE IN MOBILE COMMUNICATION SYSTEM AND METHOD FOR TRANSMITTING INFORMATION THEREOF

This Application is a 35 U.S.C. §371 National Stage Entry of International Application No. PCT/KR2012/002149, filed Mar. 23, 2012 and claims the benefit of U.S. Provisional Application No. 61/467,384, filed Mar. 25, 2011, all of which are incorporated by reference in their entirety herein.

TECHNICAL FIELD

The present invention relates to a method and apparatus for configuring a backhaul link subframe in a mobile communication system and transmitting information on the configured backhaul link subframe.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system, MC-FDMA (multi carrier frequency division multiple access) system and the like.

DISCLOSURE OF THE INVENTION

Technical Task

The technical task of the present invention is to provide a method and apparatus for configuring a backhaul link subframe in consideration of a propagation delay value and sharing information on the configured backhaul link subframe.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of transmitting a signal, which is transmitted to a $2^{nd}$ node by a $1^{st}$ node in a mobile communication system, according to a $1^{st}$ embodiment of the present invention may include the steps of determining a $1^{st}$ slot configuration and a $2^{nd}$ slot configuration in accordance with a propagation delay value between the $1^{st}$ node and the $2^{nd}$ node and transmitting the signal through a subframe having a structure determined according to the $1^{st}$ slot configuration and the $2^{nd}$ slot configuration, wherein each of the $1^{st}$ slot configuration and the $2^{nd}$ slot configuration include a start symbol and an end symbol determined in consideration of the propagation delay value, respectively.

To further achieve these and other advantages and in accordance with the purpose of the present invention, a method of receiving a signal, which is received by a $2^{nd}$ node from a $1^{st}$ node in a mobile communication system, according to a $2^{nd}$ embodiment of the present invention may include the step of receiving the signal through a subframe having a structure determined according to a $1^{st}$ slot configuration and a $2^{nd}$ slot configuration determined in accordance with a propagation delay value between the $1^{st}$ node and the $2^{nd}$ node, wherein each of the $1^{st}$ slot configuration and the $2^{nd}$ slot configuration include a start symbol and an end symbol determined in consideration of the propagation delay value, respectively.

To further achieve these and other advantages and in accordance with the purpose of the present invention, in a mobile communication system, an apparatus for transmitting a signal according to a $3^{rd}$ embodiment of the present invention may include a transmitting module and a processor controlling the apparatus including the transmitting module, the processor determining a $1^{st}$ slot configuration and a $2^{nd}$ slot configuration in accordance with a propagation delay value between a $1^{st}$ node corresponding to the apparatus and a $2^{nd}$ node, the processor transmitting the signal through a subframe having a structure determined according to the $1^{st}$ slot configuration and the $2^{nd}$ slot configuration, wherein each of the $1^{st}$ slot configuration and the $2^{nd}$ slot configuration include a start symbol and an end symbol determined in consideration of the propagation delay value, respectively.

To further achieve these and other advantages and in accordance with the purpose of the present invention, in a mobile communication system, an apparatus for receiving a signal according to a $4^{th}$ embodiment of the present invention may include a receiving module and a processor controlling the apparatus including the receiving module, the processor receiving the signal through a subframe having a structure determined according to a $1^{st}$ slot configuration and a $2^{nd}$ slot configuration determined in accordance with a propagation delay value between a $1^{st}$ node and a $2^{nd}$ node corresponding to the apparatus, wherein the each of $1^{st}$ slot configuration and the $2^{nd}$ slot configuration include a start symbol and an end symbol determined in consideration of the propagation delay value, respectively.

The following matters may be applicable in common to the $1^{st}$ to $4^{th}$ embodiments of the present invention entirely or in part.

Preferably, the $1^{st}$ node may include a base station and the $2^{nd}$ node may include a mobile relay node.

More preferably, if subframe boundaries of the $1^{st}$ and $2^{nd}$ nodes are aligned with each other, the start symbol of the $1^{st}$ slot configuration may be determined using the propagation delay value, a guard interval and the number of symbols occupied by a control information transmitted to a user equipment from the $2^{nd}$ node and the end symbol of the $2^{nd}$ slot configuration may be determined using the propagation delay value and the guard interval.

More preferably, if subframe boundaries of the $1^{st}$ and $2^{nd}$ nodes are not aligned with each other, the start symbol of the $1^{st}$ slot configuration may be determined using the propagation delay value, a guard interval, the number of symbols occupied by a control information transmitted to a user equipment from the $2^{nd}$ node and a difference value between the subframe boundary of the $1^{st}$ node and the subframe boundary of the $2^{nd}$ node and the end symbol of the $2^{nd}$ slot configuration may be determined using the propagation delay value, the guard interval and the difference value between the subframe boundary of the $1^{st}$ node and the subframe boundary of the $2^{nd}$ node.

Preferably, the method may further include the step of transmitting the determined $1^{st}$ slot configuration and the determined $2^{nd}$ slot configuration to the $2^{nd}$ node.

Preferably, the propagation delay value may be received from the $2^{nd}$ node.

Preferably, the propagation delay value may include a value estimated by the $1^{st}$ node.

Advantageous Effects

According to the present invention, a backhaul link subframe can be dynamically changed in accordance with variation of a propagation delay value. Moreover, since information on the changed backhaul link subframe is sharable, a receiving side can perform accurate demodulation.

Effects obtainable from the present invention are non-limited by the above mentioned effects. And, other unmentioned effects can be clearly understood from the following description by those having ordinary skill in the technical field to which the present invention pertains.

DESCRIPTION OF DRAWINGS

FIGS. 11 to 13 are diagrams for configurations of backhaul downlink link subframes depending on increment of a propagation delay value if subframe boundaries are aligned with each other.

FIGS. 15 to 17 are diagrams for configurations of backhaul uplink subframes depending on increment of a propagation delay value if subframe boundaries are aligned with each other.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. Detailed description disclosed together with the accompanying drawings is intended to explain not a unique embodiment of the present invention but an exemplary embodiment of the present invention. For instance, although the following descriptions are made in detail on the assumption that a mobile communication system includes a system of 3GPP LTE series, they are applicable to other random mobile communication systems except unique features of the 3GPP LTE series system.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS) and the like. And, assume that a base station is a common name of such a random node of a network stage communicating with a terminal as a Node B, an eNode B, a BS and the like.

Figure 1:
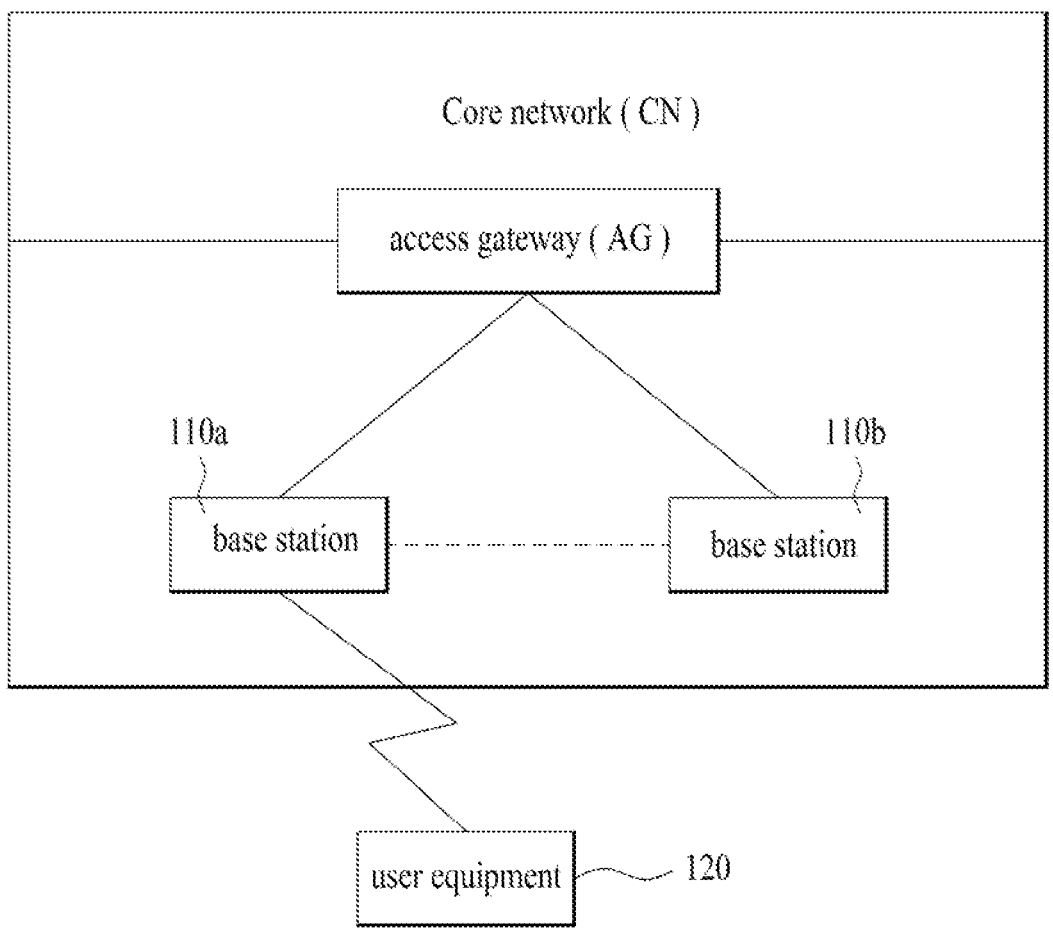
FIG. 1 is a diagram to describe a structure of LTE system.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service. At least one or more cells (e.g., 3 cells) exist in one base station. The cell is set to one of bandwidths including 1.4 MHz, 3 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

Figure 2:
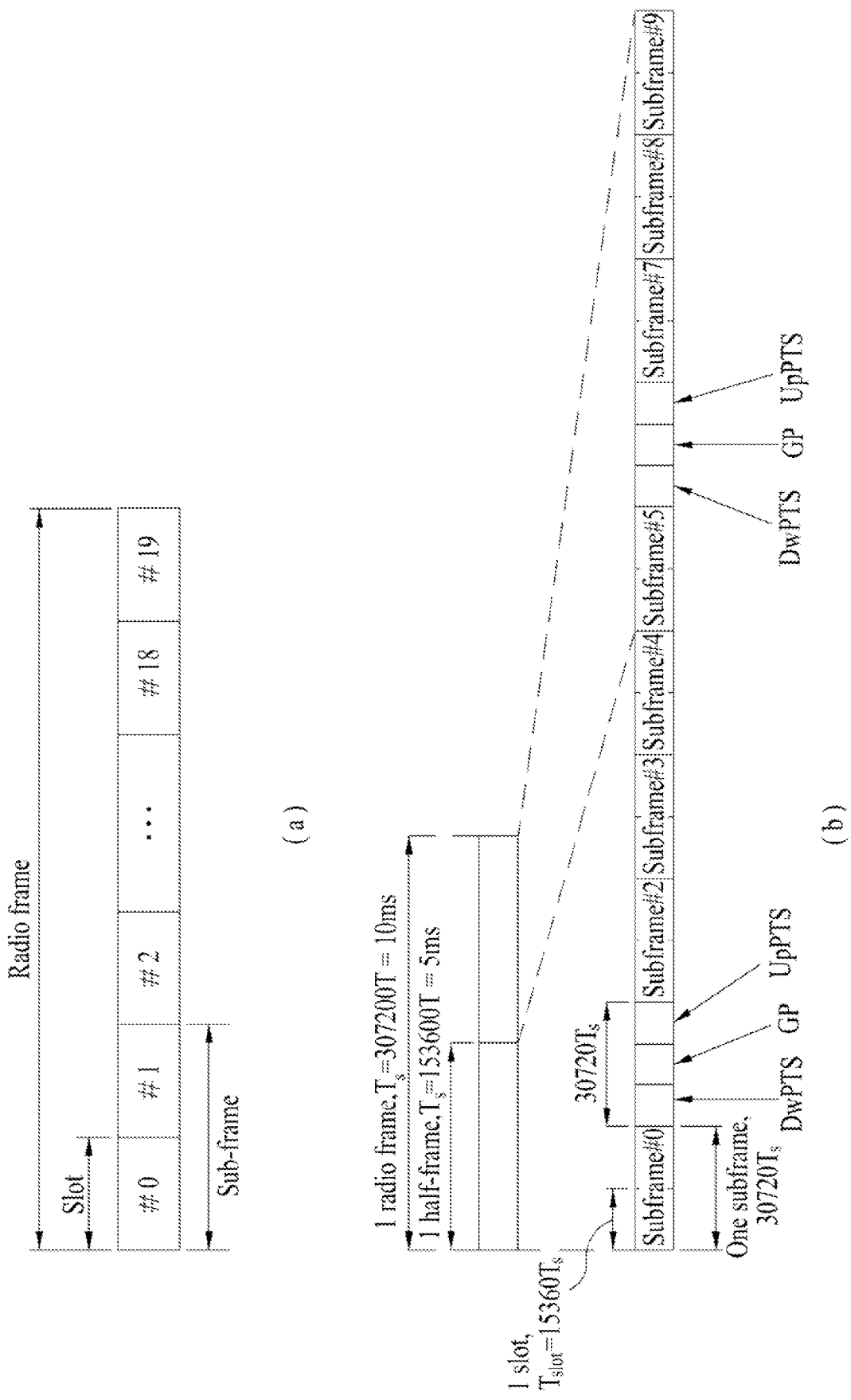
FIG. 2 is a diagram for a structure of a radio frame used by LTE system.

FIG. 2(a) is a diagram for a structure of a radio frame used by 3GPP LTE system. One radio frame includes 10 subframes. Each of the subframes includes 2 slots in a time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in a time domain. Since 3GPP LTE system uses OFDMA in downlink, the OFDM symbol indicates one symbol duration (or period). The OFDM symbol may be named SC-FDMA symbol or symbol period in uplink. Resource block (RB) is a resource allocation unit and may include a plurality of contiguous subcarriers in one slot. The above-mentioned radio frame structure is just exemplary. Hence, the number of subframes included in a radio frame, the number of slots included in the subframe and the number of OFDM symbols included in the slot may be modified in various ways.

FIG. 2(b) shows one example of a structure of a type-2 radio frame 2. The type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

The above-described structures of the radio frame are just exemplary. And, the number of subframes included in a radio frame, the number of slots included in the subframe and the number of symbols included in the slot may be modified in various ways.

Figure 3:
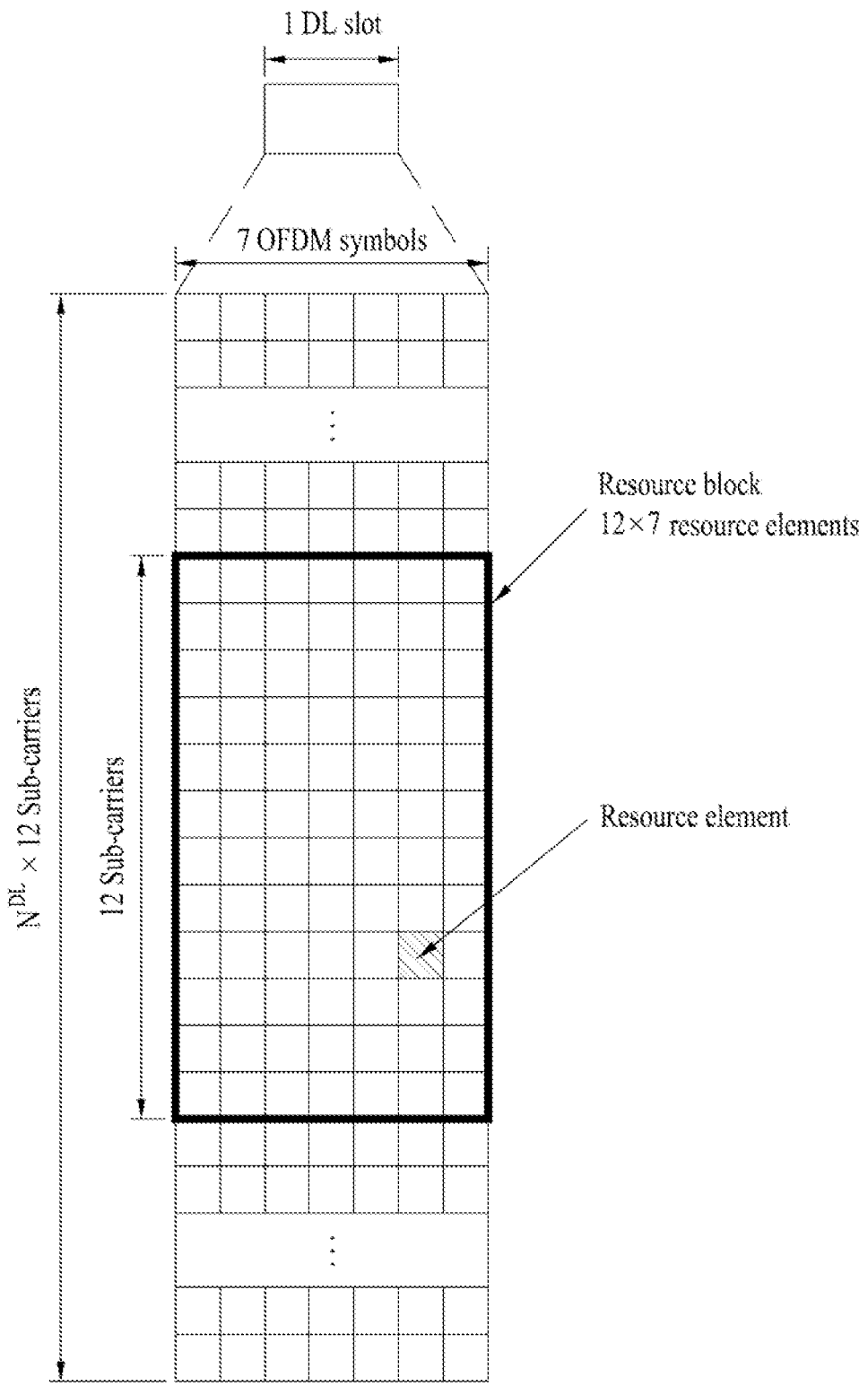
FIG. 3 is a diagram of a resource grid in a downlink slot.

FIG. 3 is a diagram of a resource grid in a downlink (DL) slot. One downlink (DL) slot may include 7 OFDM symbols in a time domain and one resource block (RB) may include 12 subcarriers in a frequency domain, by which the present invention may be non-limited. For instance, in case of a normal cyclic prefix (CP), one slot includes 7 OFDM symbols. Yet, in case of an extended CP, one slot may include 6 OFDM symbols. Each element on a resource grid may be named a resource element (hereinafter abbreviated RE). One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 4:
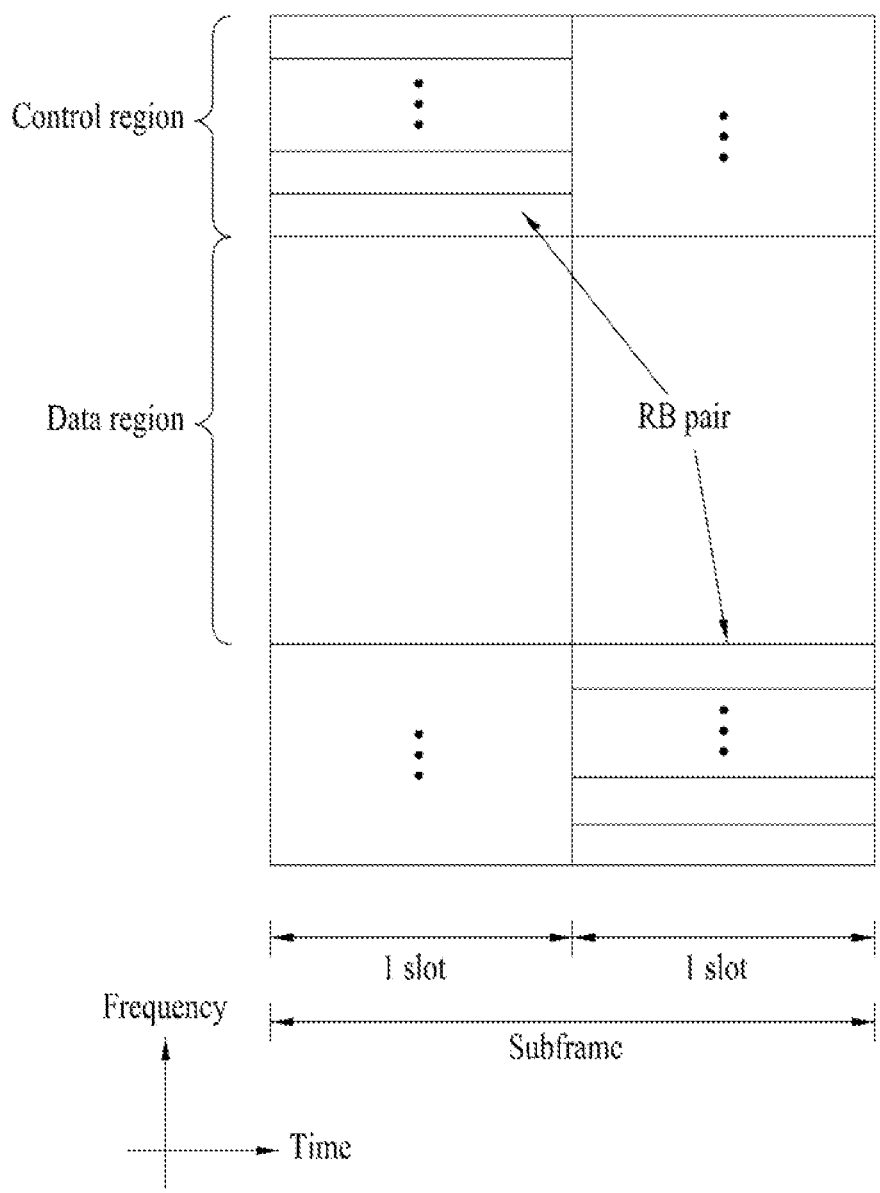
FIG. 4 is a diagram for a structure of an uplink subframe.

FIG. 4 is a diagram for a structure of an uplink (UL) subframe. A UL subframe may be divided into a control region and a data region in a frequency domain. A physical UL control channel (PUCCH) including UL control information may be assigned to the control region. And, a physical UL shared channel (PUSCH) including user data may be assigned to the data region. In order to maintain single carrier property, one user equipment does not transmit PUCCH and PUSCH simultaneously. PUCCH for one user equipment may be allocated to a resource block pair (RB pair) in a subframe. Resource blocks belonging to the resource block pair may occupy different subcarriers for 2 slots. Namely, a resource block pair allocated to PUCCH is frequency-hopped on a slot boundary.

Figure 5:
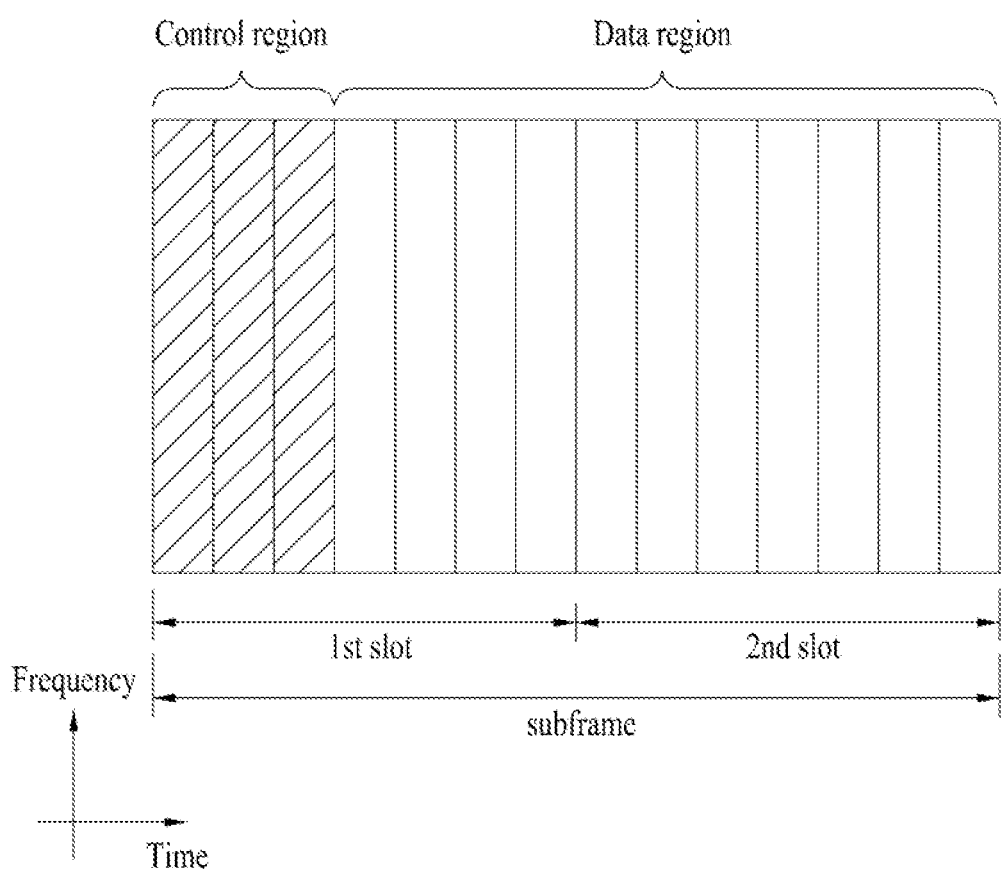
FIG. 5 is a diagram for a structure of a downlink subframe.

FIG. 5 is a diagram for a structure of a downlink (DL) subframe. Maximum 4 OFDM symbols situated in a head part of a first slot of one subframe correspond to a control region to which a control channel is assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and includes information on the number of OFDM symbols used for a transmission of a control channel within the subframe. The PHICH includes HARQ ACK/NACK signal in response to a UL transmission. The PDCCH may include UL or DL scheduling information and power control information.

Figure 6:
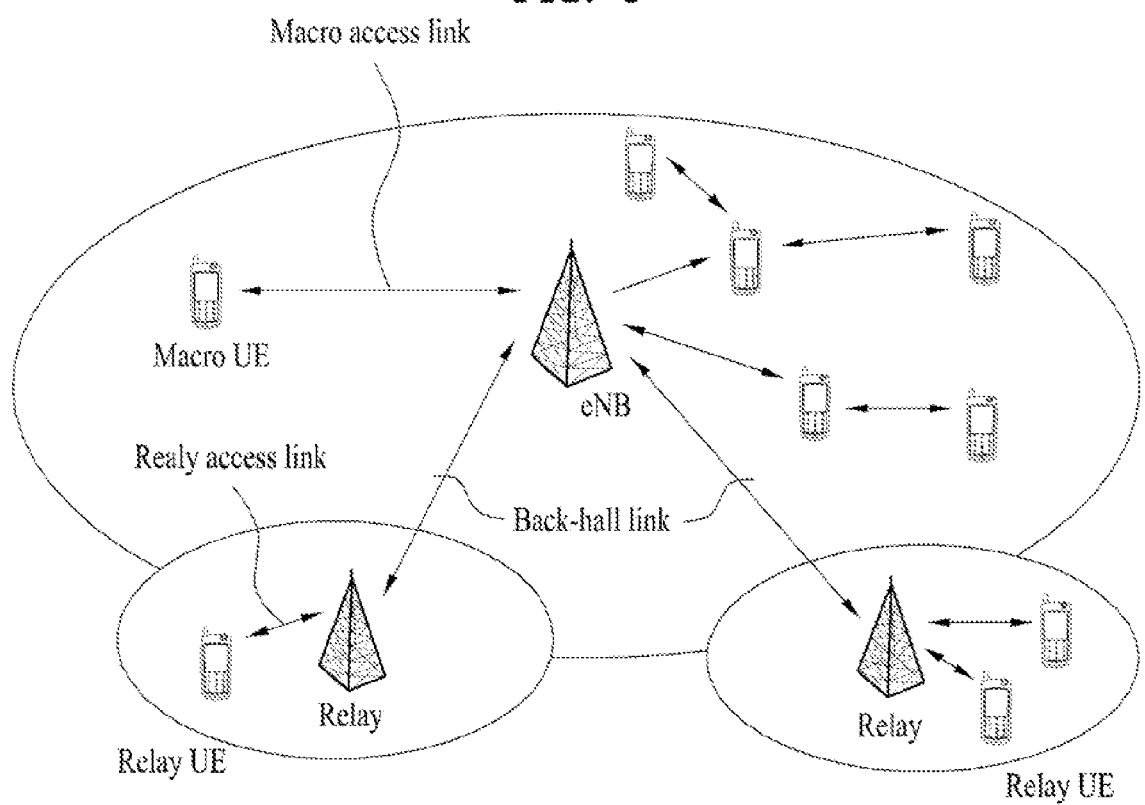
FIG. 6 is a diagram of a wireless communication system including a relay.

FIG. 6 shows one example of a wireless communication system including a relay. The relay extends a service area of a base station or is installed in a radio shadow area to smooth a service operation.

Referring to FIG. 6, a wireless communication system includes a base station (eNB), a relay and a user equipment. The user equipment performs a communication with the base station or the relay. For clarity, a user equipment configured to communicate with a base station shall be named a macro user equipment (i.e., a macro UE) and a user equipment configured to communicate with a relay shall be named a relay user equipment (i.e., a relay UE). A communication link between a base station and a macro user equipment shall be named a macro access link and a communication link between a relay and a relay user equipment shall be named a relay access link. And, a communication link between a base station and a relay shall be named a backhaul link.

Relays can be categorized into L1 (layer 1) relay, L2 (layer 2) relay and L3 (layer 3) relay depending on how many functions the corresponding relay can perform in multi-hop transmission. In accordance with a network link, relays can be classified into an in-band connection, in which a network-to-relay link and a network-to-user equipment link share the same frequency band with each other in a donor cell, and an out-band connection, in which a network-to-relay link and a network-to-user equipment link use different frequency bands in a donor cell, respectively. Relays can be classified, depending on whether a user equipment recognizes a presence of a relay, into a transparent relay (i.e., a user equipment is unable to know whether a communication with a network is performed via a relay) and a non-transparent relay (i.e., a user equipment is aware that a communication with a network is performed via a relay). Relays can be classified, in aspect of mobility, into a fixed relay used for shadow area or cell coverage enhancement, a nomadic relay (this is temporarily installed in case of a sudden increase of users or randomly movable within a building) and a mobile relay installable on such a public transportation as a bus, a subway and the like.

Figure 7:
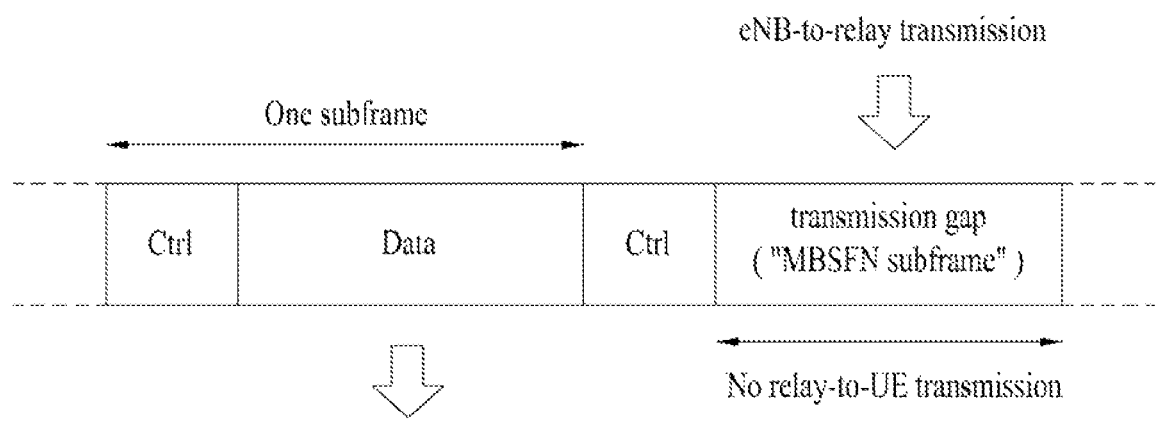
FIG. 7 is a diagram for one example of performing a backhaul transmission using MBSFN subframe.

FIG. 7 shows one example of performing a backhaul transmission using MBSFN (multimedia broadcast over a single frequency network) subframe. In an in-band relay mode, a BS-RN link (i.e., a backhaul link) operates on the same frequency band of an RN-UE link (i.e., a relay access link). When a relay transmits a signal to a user equipment while receiving a signal from a base station, and vice versa, since a transmitter and receiver of the relay trigger mutual interference, the relay may be restricted from performing the transmission and the reception at the same time. To this end, the backhaul link and the relay access link are partitioned by TDM scheme. In order to support a measurement operation of a legacy LTE user equipment existing in a relay zone, LTE-A configures a backhaul link in MBSFN subframe [Fake MBSFN Method]. If a random subframe is signaled in an MBSFN subframe, since a user equipment only receives a control region (ctrl) of the corresponding subframe, a relay is able to configure a backhaul link using a data region of the corresponding subframe.

Currently, a structure of the subframe of the backhaul link can be determined using Table 1 and Table 2 in the following. In particular, a base station of LTE/LTE-A system currently uses a subframe, which uses OFDM symbol configured in combination of a $1^{st}$ slot configuration shown in Table 1 and a $2^{nd}$ slot configuration shown in Table 2, as a backhaul link subframe.

TABLE 1

| Configuration | DL_StartSymbol | End symbol index |
|---|---|---|
| 0 | 1 | 6 |
| 1 | 2 | 6 |
| 2 | 3 | 6 |

TABLE 2

| Configuration | Start symbol index | End symbol index |
|---|---|---|
| 0 | 0 | 6 |
| 1 | 0 | 5 |

In Table 1, DL_StartSymbol indicates a $1^{st}$ OFDM symbol among OFDM symbols usable in a $1^{st}$ slot of a backhaul link subframe and End symbol index indicates a last OFDM symbol among the OFDM symbols usable in the $1^{st}$ slot. In Table 2, DL_StartSymbol indicates a $1^{st}$ OFDM symbol among OFDM symbols usable in a $2^{nd}$ slot of the backhaul link subframe and End symbol index indicates a last OFDM symbol among the OFDM symbols usable in the $2^{nd}$ slot. Hence, the backhaul link subframe can be configured in accordance with a combination of the configurations shown in Table 1 and Table 2. In this case, Configuration 0 in Table 1 and Configuration 0 in Table 2 are not used at the same time.

Figure 8:
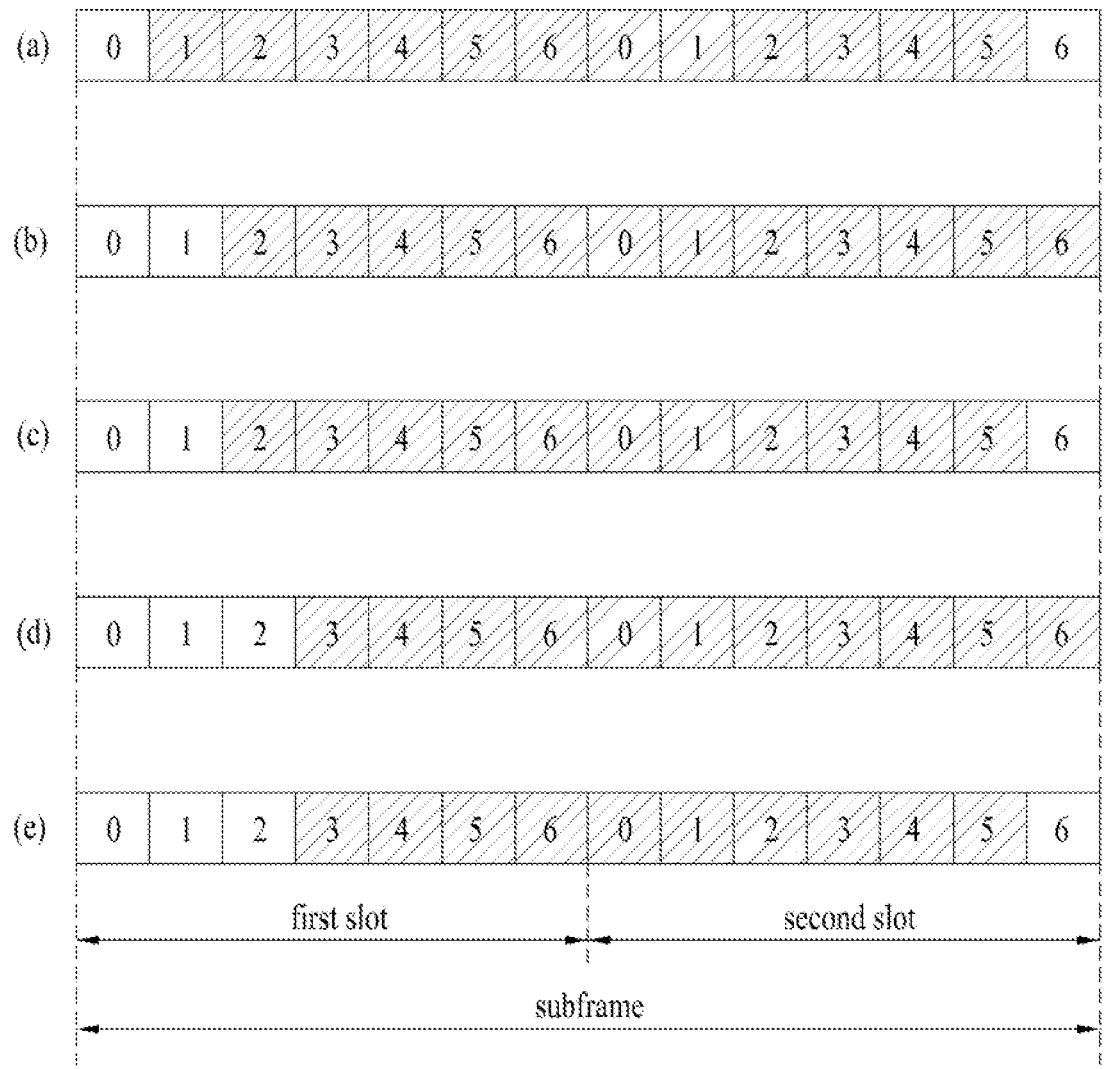
FIG. 8 is a diagram for configurations of backhaul link subframes available for an existing LTE/LTE-A system.

FIG. 8 is a diagram for one example of configurations of backhaul link subframes determined using Table 1 and Table 2. FIG. 8(a) shows a combination of Configuration 0 in Table 1 and Configuration 1 in Table 2. FIG. 8(b) shows a combination of Configuration 1 in Table 1 and Configuration 0 in Table 2. FIG. 8(c) shows a combination of Configuration 1 in Table 1 and Configuration 1 in Table 2. FIG. 8 (d) shows a combination of Configuration 2 in Table 1 and Configuration 0 in Table 2. FIG. 8 (e) shows a combination of Configuration 2 in Table 1 and Configuration 1 in Table 2.

Figure 9:
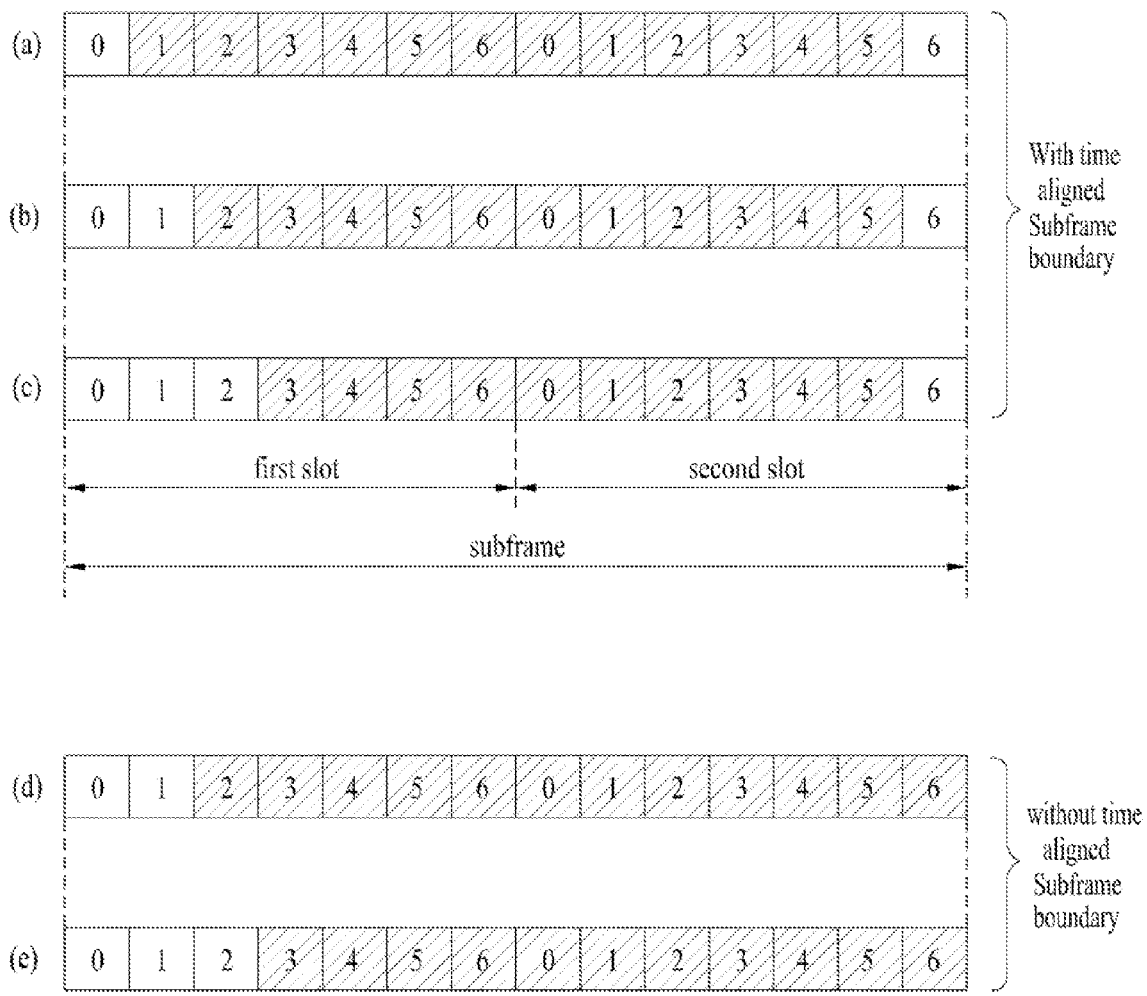
FIG. 9 is a diagram for configurations of backhaul link subframes available depending on whether subframe boundaries coincide with each other in an existing LTE/LTE-A system.

Meanwhile, a combination of slot configurations usable depending on whether a boundary of a subframe used by a base station coincides with (or is aligned with) a boundary of a subframe used by a relay is determined, which is shown in FIG. 9. Referring to FIG. 9, each of FIG. 9(a), FIG. 9(b) and FIG. 9(c) shows a combination of slot configurations usable if subframe boundaries of a base station and a relay node are aligned with each other. On the contrary, each of FIG. 9(d) and FIG. 9 (e) shows a combination of slot configurations usable if subframe boundaries of a base station and a relay node are not aligned with each other.

As mentioned in the foregoing description, the determined backhaul link subframe is able to support a transmission in backhaul link without affecting an access link. Moreover, the determined backhaul link subframe can accept a propagation delay to a prescribed extent. This is described with reference to FIG. 10 as follows.

Figure 10:
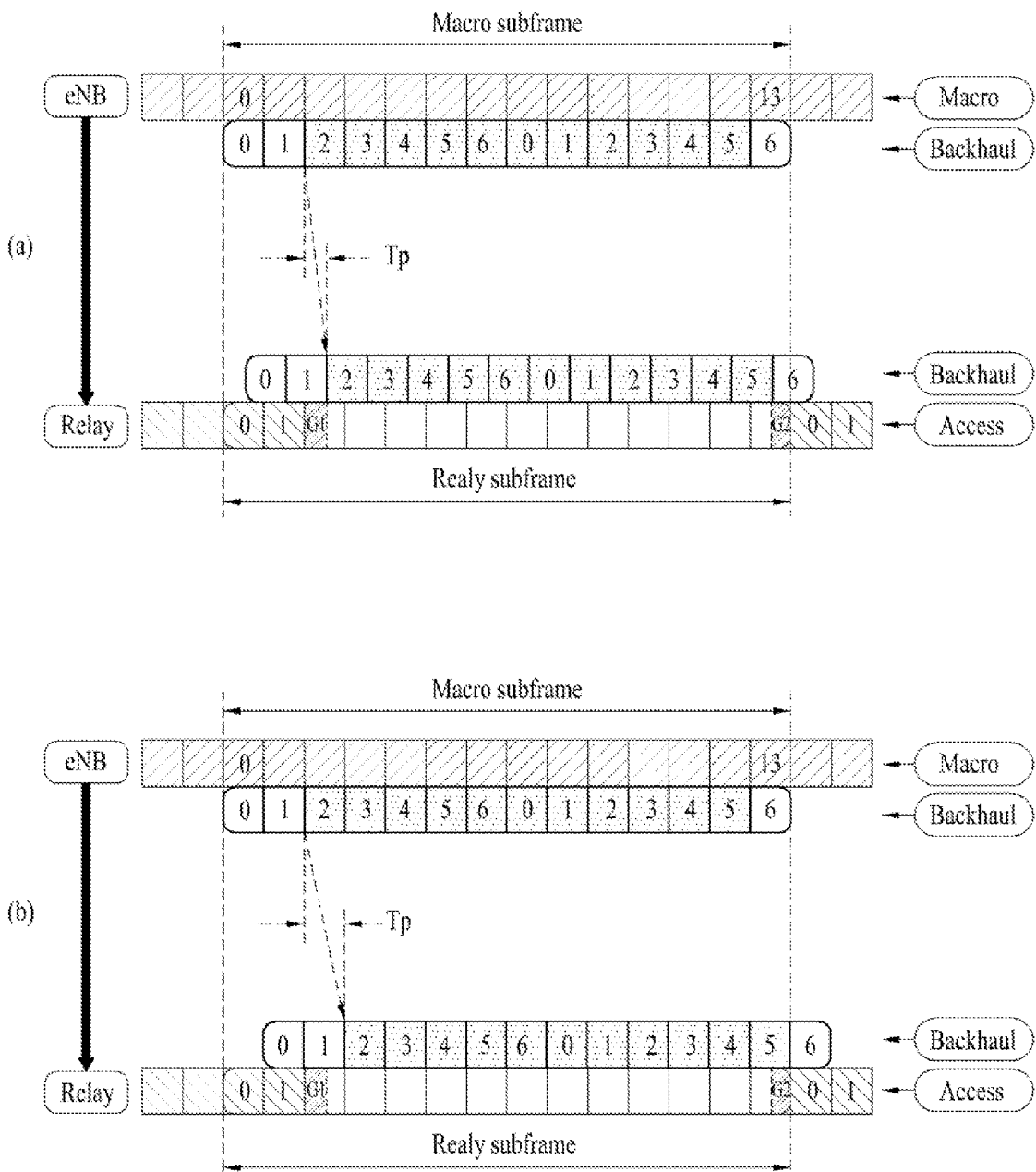
FIG. 10 is a diagram to describe an eNB-to-relay downlink transmission.

FIG. 10 is a diagram to describe an eNB-to-relay downlink transmission. Referring to FIG. 10, a subframe boundary of a base station (eNB) coincides with that of a relay. FIG. 10(a) shows a case of a non-presence of a propagation delay, while FIG. 10(b) shows a case of a presence of a propagation delay. In FIG. 10, G1 indicates a guard interval necessary for a relay to switch to a backhaul link reception from an access link transmission, while G2 indicates a guard interval necessary for a relay to switch to an access link transmission from a backhaul link reception.

Referring to FIG. 10(a), it can be observed that there is a propagation delay amounting to about 0.5 OFDM symbol. In this case, considering OFDM symbols (OFDM symbol index 0, OFDM symbol index 1), a guard interval (G1) and a propagation delay (Tp) used for PDCCH transmitted to a user equipment in an access link transmission by a relay, a start OFDM symbol index of a $1^{st}$ slot becomes 2. And, a last OFDM symbol index of a $2^{nd}$ slot becomes 5. Hence, a base station can use a backhaul link subframe corresponding to a $1^{st}$ slot configuration 1 and a $2^{nd}$ slot configuration 1.

Yet, as mentioned in the foregoing description, a backhaul link subframe in a current LTE/LTE-A system can cope with a propagation delay corresponding to a time amounting to about 0.5 OFDM symbol only. In particular, referring to FIG. 10(b), if a propagation delay value increases up to about 1 OFDM symbol, when the backhaul link subframe shown in FIG. 10(a), a last OFDM symbol (index 5) overlaps a guard interval G2 (i.e., cannot secure a time necessary for a relay to switch to an access link transmission from a backhaul link reception), the access link transmission by the relay is affected.

In particular, in case of a mobile relay (i.e., a relay has mobility), a propagation delay value frequently varies. Hence, a configuration of a backhaul link subframe needs to be set dynamic to prevent an access link from being affected. In doing so, the configuration of the backhaul link subframe needs to be shared between a base station and a relay. Therefore, the embodiments disclosed in the following relate to how to configure a backhaul link subframe in accordance with a variable propagation delay value and how to inform a relay of a structure of a backhaul link subframe varying in accordance with a propagation delay value. The embodiments mentioned in the following description are made centering on a relation between a base station and a relay, by which the present invention may be non-limited, and can be applied to a relation between a base station and a user equipment.

$1^{st}$ Embodiment $1^{st}$ embodiment of the present invention relates to a backhaul link subframe in a base station-to-relay downlink in case that a subframe boundary of a base station and a subframe of a relay are aligned with each other. For clarity of the following description, how to configure a backhaul link subframe in accordance with a variation of a propagation delay value in a base station-to-relay downlink is explained in the first place and a method of sharing this configuration information between a base station and a relay is then explained.

Figure 11:
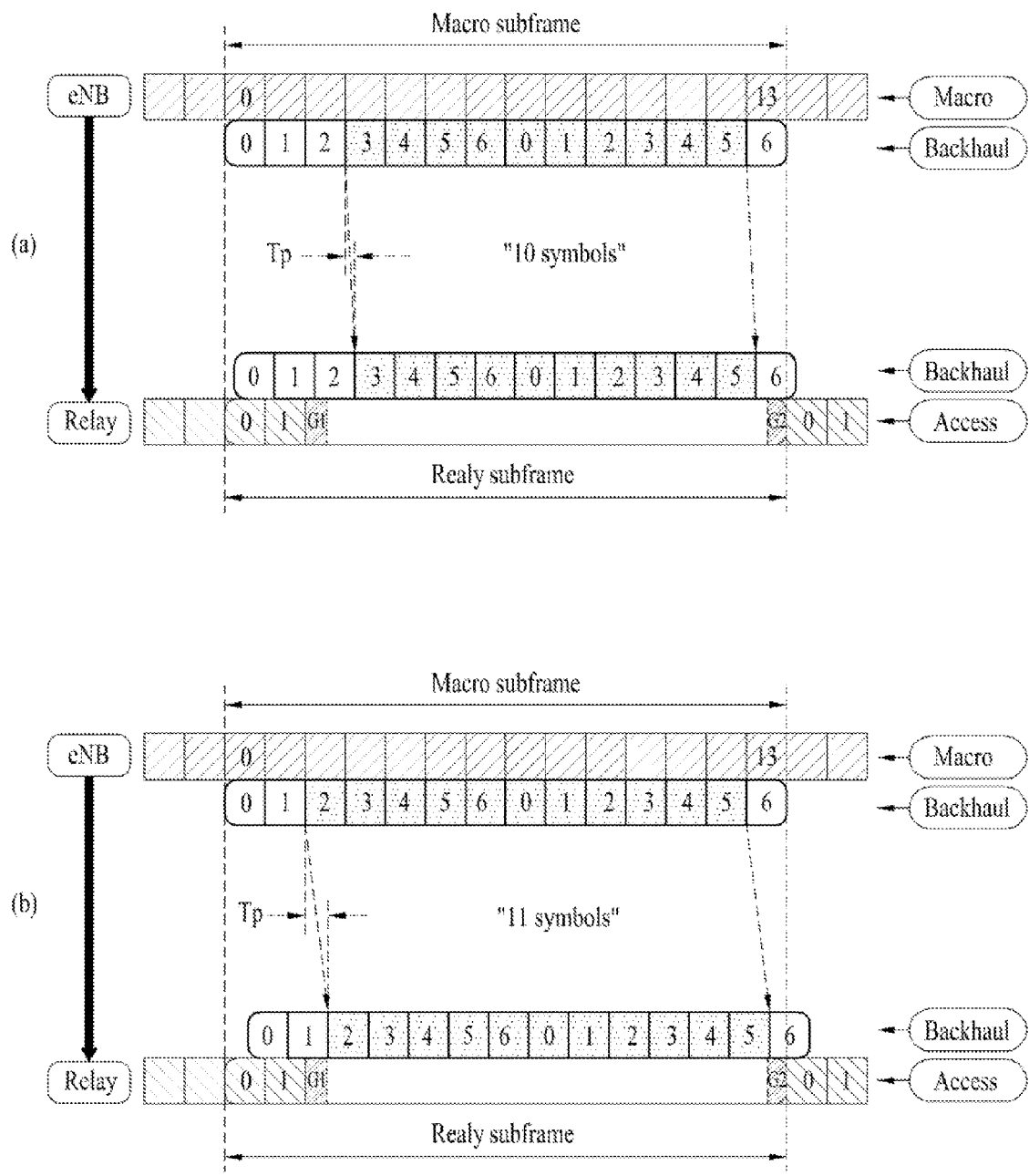
Figure 13:
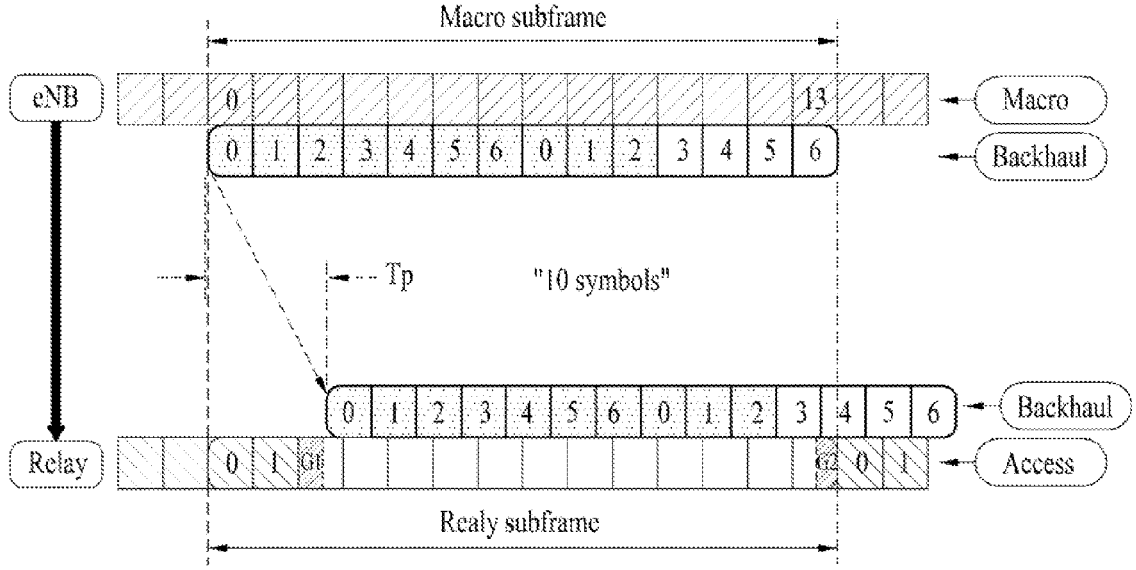

FIGS. 11 to 13 are diagrams for configurations of backhaul downlink link subframes depending on increment of a propagation delay value if subframe boundaries are aligned with each other. In the following description, assume that OFDM symbols used for PDCCH transmitted to a user equipment from a relay in an access link transmission include first two symbols.

Referring to FIG. 11(a), a propagation delay value is smaller than a guard interval. In FIG. 11(a), considering two OFDM symbols and a guard interval used for an access link, a backhaul link subframe can use an OFDM symbol of an index 3 in a $1^{st}$ slot. An end symbol in a $2^{nd}$ slot may become an OFDM symbol in consideration of the guard interval. And, the number of available OFDM symbols is 10.

FIG. 11(b) shows that a propagation delay value increases higher than that shown in FIG. 11(a). Referring to FIG. 11(b), a backhaul link subframe has an OFDM symbol of an index 2 as a start symbol in a $1^{st}$ slot and also has an OFDM symbol of an index 5 as an end symbol in a $2^{nd}$ slot. And, the number of available OFDM symbols is 11.

Subsequently, FIG. 12(a) shows a case of having a propagation delay value a little bit greater than a time corresponding to one OFDM symbol. Referring to FIG. 12(a), a backhaul link subframe has an OFDM symbol of an index 2 as a start symbol in a $1^{st}$ slot and also has an OFDM symbol of an index 4 as an end symbol in a $2^{nd}$ slot. And, the number of available OFDM symbols is 11. As the propagation delay value becomes greater than that shown in FIG. 11(b), it can be observed that an index of the end symbol in the $2^{nd}$ slot is changed into 4 from 5. And, the number of available OFDM symbols becomes 10.

In FIG. 12(b), a backhaul link subframe has an OFDM symbol of an index 1 as a start symbol in a $1^{st}$ slot and also has an OFDM symbol of an index 3 as an end symbol in a $2^{nd}$ slot. As the propagation delay value increases a little bit more than that shown in FIG. 12(a), although the index of the end symbol is changed into 3, since the index of the start symbol is changed into 1, the total number of available OFDM symbols is maintained as 10.

FIG. 13(a) shows a case of having a propagation delay value a little bit greater than two OFDM symbols. In this case, a backhaul link subframe has an OFDM symbol of an index 1 as a start symbol in a $1^{st}$ slot and also has an OFDM symbol of an index 2 as an end symbol in a $2^{nd}$ slot. And, the number of available OFDM symbols is 10.

As mentioned in the above description, a configuration of a backhaul link subframe is dynamically determined by a base station through a propagation delay value. In doing so, slot configurations (cf. Table 1 and Table 2) in an existing LTE/LTE-A system can be used. Yet, in order to support the change of start and end symbols depending on an increment of the propagation delay value, Table 1 indicating the $1^{st}$ slot configuration of the backhaul link subframe can be modified into Table 3 and Table 2 indicating the $2^{nd}$ slot configuration can be modified into Table 4. In this case, Table 3 and Table 4 show the examples of considering about 2 OFDM symbols as a propagation delay value. If the propagation delay value is further greater, the tables may be changed.

TABLE 3

| Configuration | DL-startSymbol | End symbol index |
|---|---|---|
| 0 | 0 | 6 |
| 1 | 1 | 6 |
| 2 | 2 | 6 |
| 3 | 3 | 6 |

TABLE 4

| Configuration | Start symbol index | End symbol index |
|---|---|---|
| 0 | 0 | 6 |
| 1 | 0 | 5 |
| 2 | 0 | 4 |
| 3 | 0 | 3 |
| 4 | 0 | 2 |

In addition to Table 3 and Table 4, corresponding relations among a propagation delay value, a $1^{st}$ slot configuration and a $2^{nd}$ slot configuration can be set up in advance. For instance, the corresponding relations may be set as Table 5.

TABLE 5

| Propagation delay | First slot configuration | Second slot configuration |
|---|---|---|
| 0 <= Tp < gurad interval | 3 | 1 |
| ... | ... | ... |
| Tp >= 2symbol + gurad interval | 0 | 4 |

In summary, as mentioned in the foregoing descriptions with reference to FIGS. 11 to 13, the increment of a propagation delay value brings a change of a backhaul link subframe structure and a base station is able to dynamically configure and use a backhaul link subframe in accordance with the propagation delay value. Yet, in this case, it is necessary for a relay to be aware of a dynamically changed subframe structure for the accurate demodulation of the backhaul link subframe.

To this end, a relay frequently reports a propagation delay value (or a timing change information corresponding to the propagation delay value) and a base station is then able to configure a backhaul link subframe in accordance with the propagation delay value. In doing so, since the base station always configures the backhaul link subframe in accordance with the propagation delay value reported by the relay, the relay can accurately demodulate the backhaul link subframe without receiving information on a configuration of a newly configured backhaul link subframe. For instance, referring now to FIG. 12, the relay reports the propagation delay value Tp to the base station. Subsequently, the base station is then able to transmit PDSCH, R-PDCCH and the like in the backhaul link subframe having the start symbol index 0 in the $1^{st}$ slot and the end symbol index 2 in the $2^{nd}$ slot. Since the relay is aware that the base station has configured the backhaul link subframe using the propagation delay value Tp reported by the relay, the relay is able to predict the structure of the backhaul link subframe. Hence, the relay starts to receive the backhaul link subframe from a time relayed by the propagation delay value (i.e., from a time elapsed by the propagation delay value Tp from a timing point of starting to transmit PDCCH in the access link) and is then able to perform demodulation by recognizing that the corresponding start symbol corresponds to the index 0.

Alternatively, although a relay frequently reports a propagation delay value, a base station may be set to consider it a recommended value. Yet, in this case, since the base station may not configure a backhaul link subframe in accordance with the propagation value reported by the relay, the relay should receive information on a structure of the backhaul link subframe from the base station. Particularly, the information on the structure of the backhaul link subframe may be configured in various ways including i) $1^{st}$ slot configuration information of backhaul link subframe+end slot configuration information of backhaul link subframe, ii) start symbol index used in backhaul link subframe+total OFDM symbol number used in backhaul link subframe, iii) start OFDM symbol index used in backhaul link subframe+last OFDM symbol index used in backhaul link subframe, and the like.

Meanwhile, a base station may configure a backhaul link subframe by estimating a propagation delay value without receiving a report of the propagation delay value from a relay. In this case, a relay (RN) transmits an estimated timing information and the base station is then able to configure and transmit a backhaul link subframe to correspond to the estimated timing information.

Aside from the above-mentioned methods, the number of OFDM symbols used in a backhaul link subframe is set to a small value in advance and a base station may be set to indicate an index of a start or last symbol only. According to this method, a propagation delay value does not exceed 2 OFDM symbols in consideration of a cell size and the like in general. As mentioned in the foregoing descriptions with reference to FIGS. 11 to 13, if a propagation delay value does not exceed 2 OFDM symbols, the total number of OFDM symbols is 10 or 11. Hence, a base station and a relay agree with each other that the number of OFDM symbols used for a backhaul link subframe is 10. And, the base station may be set to indicate an index of a start OFDM symbol changed in accordance with a variation of a propagation delay value. In this case, to prepare for a case that a propagation delay value increases more, a minimum value of the number of available OFDM symbols of the backhaul link subframe in accordance with a supportable maximum propagation delay value can be included in relay capability.

In the above description, the reporting of the propagation delay value of the relay may be performed periodically or by event triggering. For instance, a reference value of a propagation delay value and a threshold of variation are set in advance. If the propagation delay value varies over the threshold in comparison with the reference value, the propagation delay value can be reported to a base station. Moreover, the above-mentioned operation can be performed based on timing advance in the current LTE/LTE-A system instead of measurement and reporting of the propagation delay value.

$2^{nd}$ Embodiment $2^{nd}$ embodiment of the present invention relates to a backhaul link subframe in a base station-to-relay downlink in case that a subframe boundary of a base station and a subframe boundary of a relay are not aligned with each other.

Figure 14:
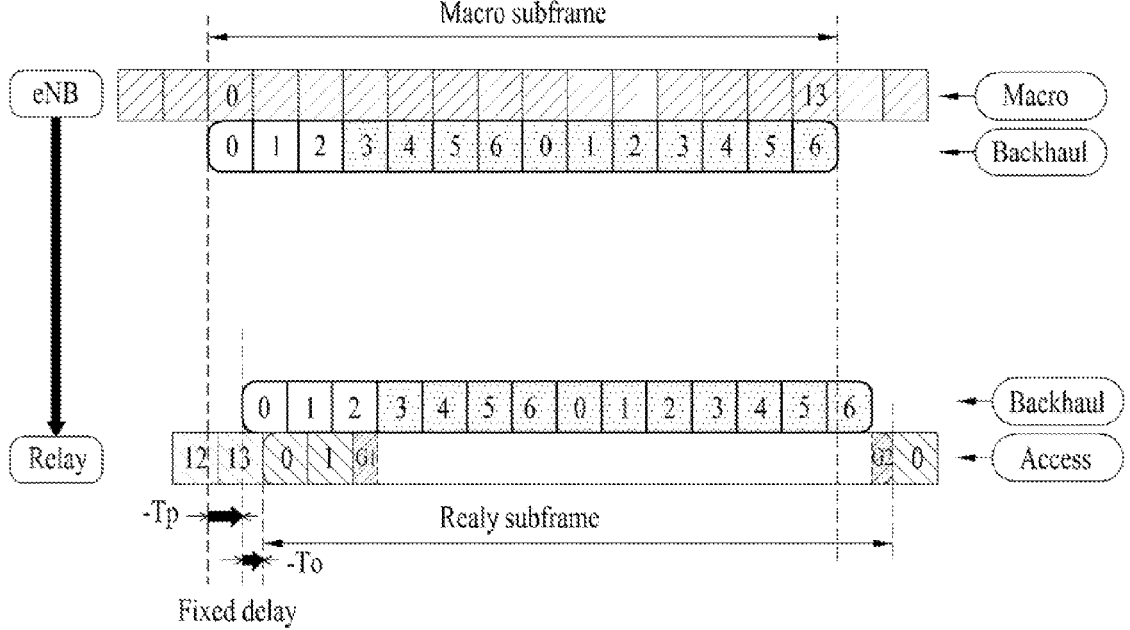
FIG. 14 is a diagram for a configuration of a backhaul downlink subframe if a subframe boundary is not aligned.

FIG. 14 is a diagram for a configuration of a backhaul downlink subframe if a subframe boundary is not aligned.

Referring to FIG. 14, compared to the $1^{st}$ embodiment, the present embodiment differs in that a backhaul link subframe is configured in further consideration of a difference value ('To+Tp' in the drawing) attribute to the fact that a subframe boundary of a base station and a subframe boundary of a relay are not aligned with each other. Hence, configurations of backhaul link subframes and methods of sharing the corresponding information with a relay shall be substituted with the former description of the $1^{st}$ embodiment.

$3^{rd}$ Embodiment $3^{rd}$ embodiment of the present invention relates to a backhaul link subframe in a relay-to-base station uplink in case that a subframe boundary of a base station and a subframe boundary of a relay are aligned with each other.

Figure 15:
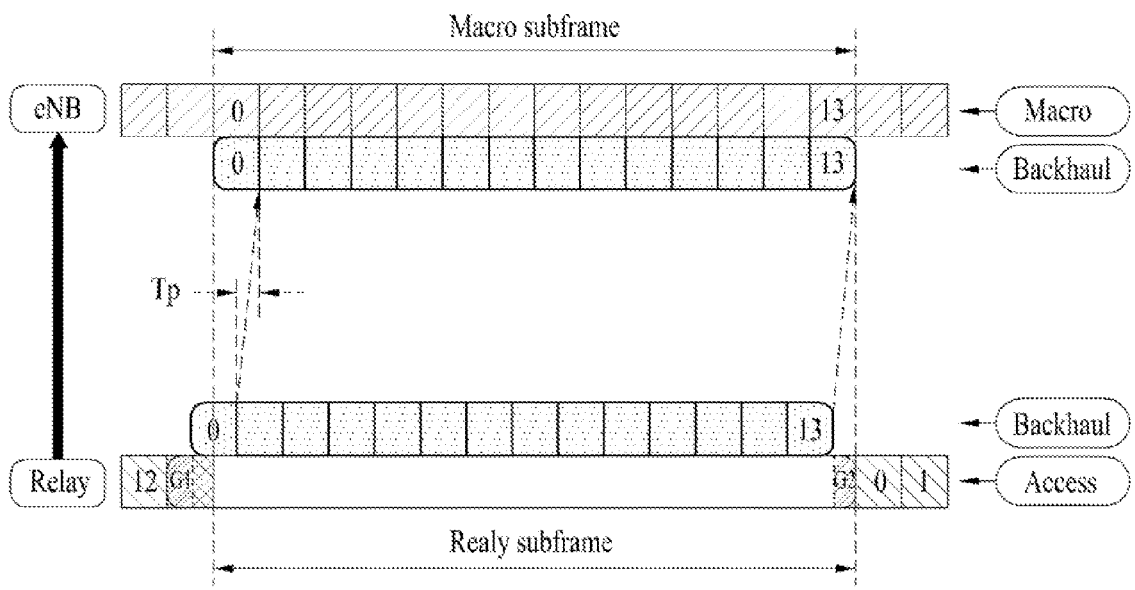

FIGS. 15 to 17 are diagrams for configurations of backhaul uplink subframes depending on increment of a propagation delay value if subframe boundaries are aligned with each other.

Referring to FIG. 15, in order to prevent an occurrence of a case that a $1^{st}$ OFDM symbol of a backhaul link subframe is not usable due to a propagation delay value Tp, user equipments in an access link do not use a last OFDM symbol of a subframe transmitted to a relay. This is similar to a case that user equipments do not use a last OFDM symbol to avoid collision with PUSCH transmission from other user equipments in SRS (sounding reference signal) transmission. Yet, in this case, if the propagation delay value increases like FIG. 16, it is unable to avoid the loss of available OFDM symbols in a backhaul link subframe.

FIG. 16 shows a possible method of a backhaul link subframe configuration in case that a propagation delay value increases. FIG. 16(a) shows a case that a $1^{st}$ OFDM symbol of a backhaul link subframe is set not to be used. And, FIG. 16(b) shows a case that user equipments are set not to further use one symbol in addition to a last OFDM symbol in an access link. Moreover, FIG. 17 shows a case that a propagation delay value is greater than that shown in FIG. 16. FIG. 17(a) shows a case that first two OFDM symbols of a backhaul link subframe are set not to be used. FIG. 17(b) shows a case that a $1^{st}$ OFDM symbol of a backhaul link subframe is set not to be used and user equipments in an access link are also set not to use last two OFDM symbols.

In the cases shown in FIG. 16(a) and FIG. 17(a), an access link is not affected but a backhaul link subframe structure is necessarily changed. Hence, in this case, as mentioned in the foregoing description of the $1^{st}$ embodiment, a structure of a backhaul link subframe can be dynamically changed in accordance with a propagation delay value. If necessary, information on the changed backhaul link subframe can be transmitted to a base station. Owing to such a configuration, the base station can accurately demodulate the backhaul link subframe transmitted from a relay. Since details of such an operation overlaps with the former description of the $1^{st}$ embodiment, they shall be omitted from the following description.

$4^{th}$ Embodiment $4^{th}$ embodiment of the present invention relates to a backhaul link subframe in a relay-to-base station uplink in case that a subframe boundary of a base station and a subframe boundary of a relay are not aligned with each other.

Figure 18:
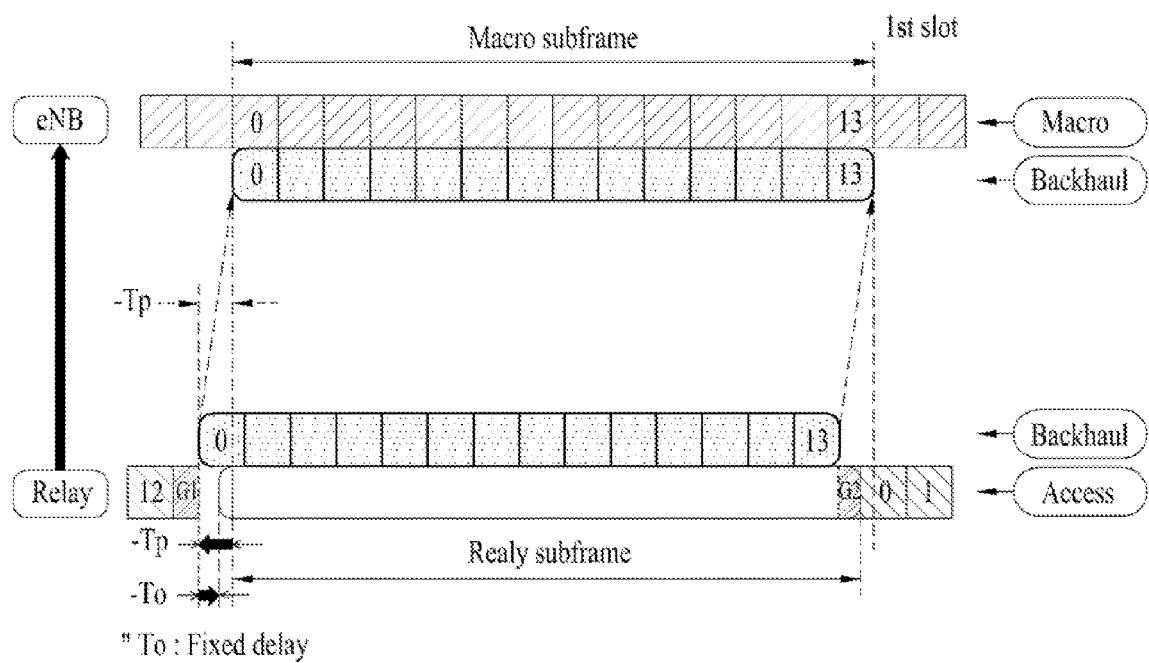
FIG. 18 is a diagram for a configuration of a backhaul uplink subframe in consideration of a propagation delay value if a subframe boundary is not aligned.

FIG. 18 is a diagram for a configuration of a backhaul uplink subframe in consideration of a propagation delay value if a subframe boundary is not aligned. The case shown in FIG. 18 can be understood as similar to the case of the $3^{rd}$ embodiment except the face that a time value due to a subframe boundary difference is further considered.

Figure 19:
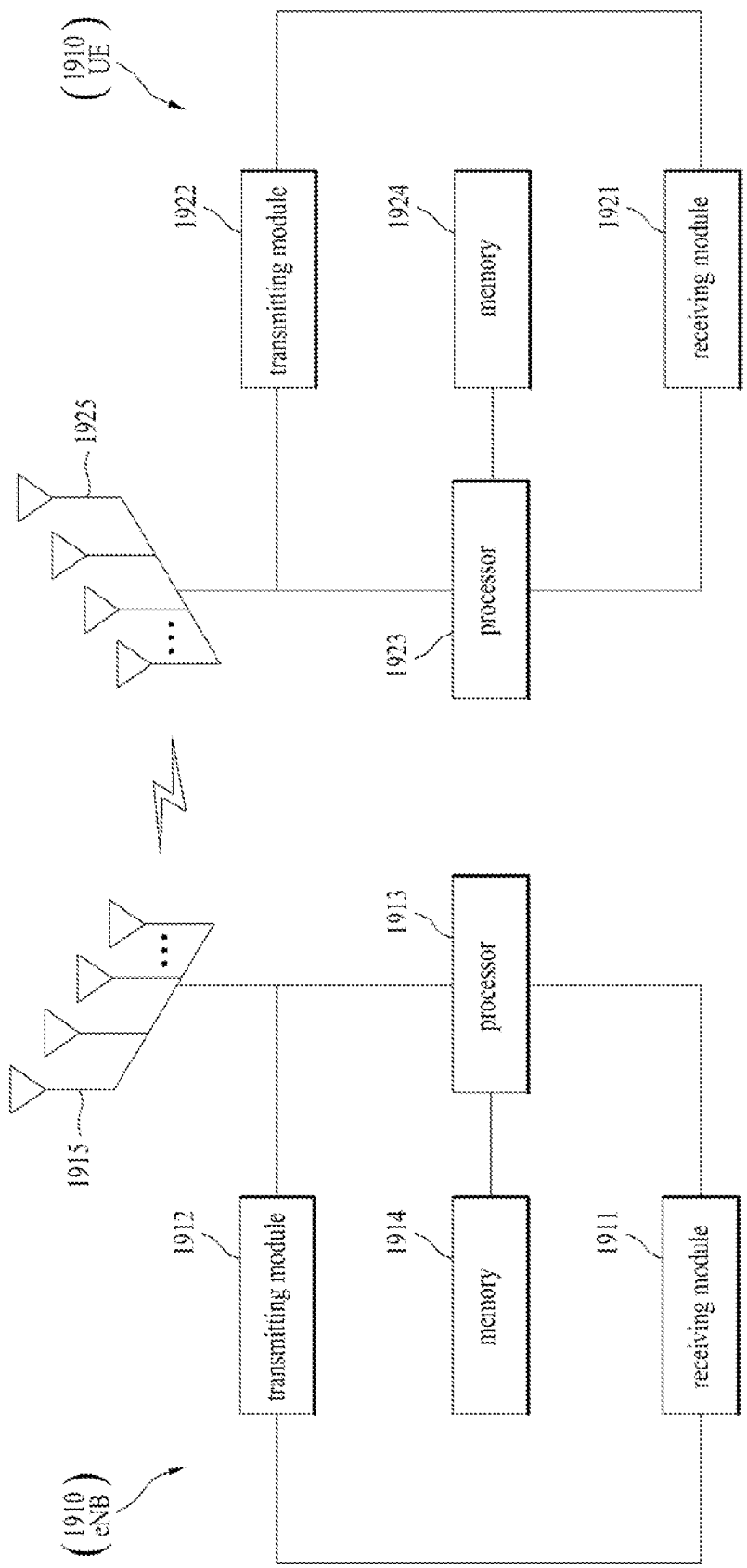
FIG. 19 is a diagram for configurations of a base station device and a user equipment device according to an embodiment of the present invention.

FIG. 19 is a diagram for configurations of a base station device and a user equipment device according to an embodiment of the present invention.

Referring to FIG. 19, a base station device 1910 according to the present invention may include a receiving module 1911, a transmitting module 1912, a processor 1913, a memory 1914 and a plurality of antennas 1915. In this case, a plurality of the antennas 1915 may mean a base station device that supports MIMO transmission and reception. The receiving module 1911 may receive various signals, data and informations in uplink from a user equipment. The transmitting module 1912 may transmit various signals, data and informations in downlink to the user equipment. And, the processor 1913 may control overall operations of the base station device 1910.

The base station device 1910 according to one embodiment of the present invention may be configured to transmit control information on uplink MIMO transmission. The processor 1913 of the base station device determines a $1^{st}$ slot configuration and a $2^{nd}$ slot configuration in accordance with a propagation delay value and is able to transmit the signal through a subframe having a structure determined using the $1^{st}$ slot configuration and the $2^{nd}$ slot configuration. In this case, the $1^{st}$ slot configuration and the $2^{nd}$ slot configuration may include a start symbol and an end symbol, which are determined in consideration of the propagation delay value, respectively.

The processor 1913 of the base station device 1910 may perform a function of operating and processing information received by the base station device 1910, information to be transmitted externally by the base station device 1910 and the like. And, the memory 1914 may be able to store the operated and processed information and the like for prescribed duration and may be substituted with such a component as a buffer (not shown in the drawing) and the like.

Subsequently, referring to FIG. 19, a user equipment device 1920 according to the present invention may include a receiving module 1921, a transmitting module 1922, a processor 1923, a memory 1924 and a plurality of antennas 1925. In this case, a plurality of the antennas 1925 may mean a user equipment device that supports MIMO transmission and reception. The receiving module 1921 may receive various signals, data and informations in downlink from a base station. The transmitting module 1922 may transmit various signals, data and informations in uplink to the base station. And, the processor 1923 may control overall operations of the user equipment device 1920.

The user equipment device 1920 according to one embodiment of the present invention may be configured to perform uplink MIMO transmission. The processor 1923 of the user equipment device can receive the signal through the subframe having the structure determined according to the $1^{st}$ and $2^{nd}$ slot configurations determined in accordance with the propagation delay value. In this case, the $1^{st}$ slot configuration and the $2^{nd}$ slot configuration may include a start symbol and an end symbol, which are determined in consideration of the propagation delay value, respectively.

The processor 1923 of the user equipment device 1920 may perform a function of operating and processing information received by the user equipment device 1920, information to be transmitted externally by the user equipment device 1920 and the like. And, the memory 1924 may be able to store the operated and processed information and the like for prescribed duration and may be substituted with such a component as a buffer (not shown in the drawing) and the like.

Regarding the detailed configurations of the base station device and the user equipment device, the matters described in the various embodiments of the present invention may be independently applied or implemented in a manner of applying at least two embodiments simultaneously. And, the redundant contents shall be omitted for clarity.

The details of the base station device 1910 in the description with reference to FIG. 19 may be identically applicable to a relay device as a DL transmission subject or a UL reception subject. And, the details of the user equipment device 1920 in the description with reference to FIG. 19 may be identically applicable to a relay device as a DL reception subject or a UL transmission subject.

The above-described embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Although the embodiments of the present invention are explained in the foregoing description centering on the type applied to mobile communications systems of 3GPP LTE series, the present invention is applicable to various kinds of mobile communication systems by the same or equivalent principles.

What is claimed is:

1. A method of transmitting a signal, which is transmitted to a $2^{nd}$ node by a $1^{st}$ node in a mobile communication system, comprising the steps of:
   receiving, from the $2^{nd}$ node, a propagation delay value between the $1^{st}$ node and the $2^{nd}$ node;
   determining a $1^{st}$ slot configuration and a $2^{nd}$ slot configuration in accordance with the propagation delay value; and
   transmitting the signal through a subframe having a structure determined according to the $1^{st}$ slot configuration and the $2^{nd}$ slot configuration,
   wherein each of the $1^{st}$ slot configuration and the $2^{nd}$ slot configuration includes a start symbol and an end symbol determined in consideration of the propagation delay value, respectively.

2. The method of claim 1, wherein the $1^{st}$ node comprises a base station and wherein the $2^{nd}$ node comprises a mobile relay node.

3. The method of claim 2, wherein if subframe boundaries of the $1^{st}$ and $2^{nd}$ nodes are aligned with each other, the start symbol of the $1^{st}$ slot configuration is determined using the propagation delay value, a guard interval and the number of symbols occupied by a control information transmitted to a user equipment from the $2^{nd}$ node and wherein the end symbol of the $2^{nd}$ slot configuration is determined using the propagation delay value and the guard interval.

4. The method of claim 2, wherein if subframe boundaries of the $1^{st}$ and $2^{nd}$ nodes are not aligned with each other, the start symbol of the $1^{st}$ slot configuration is determined using the propagation delay value, a guard interval, the number of symbols occupied by a control information transmitted to a user equipment from the $2^{nd}$ node and a difference value between the subframe boundary of the $1^{st}$ node and the subframe boundary of the $2^{nd}$ node and wherein the end symbol of the $2^{nd}$ slot configuration is determined using the propagation delay value, the guard interval and the difference value between the subframe boundary of the $1^{st}$ node and the subframe boundary of the $2^{nd}$ node.

5. The method of claim 1, further comprising the step of transmitting the determined $1^{st}$ slot configuration and the determined $2^{nd}$ slot configuration to the $2^{nd}$ node.

6. The method of claim 1, wherein the propagation delay value comprises a value estimated by the $1^{st}$ node.

7. A method of receiving a signal, which is received by a $2^{nd}$ node from a $1^{st}$ node in a mobile communication system, comprising the steps of:
- transmitting, to the $1^{st}$ node, a propagation delay value between the $1^{st}$ node and the $2^{nd}$ node,
- receiving the signal through a subframe having a structure determined according to a $1^{st}$ slot configuration and a $2^{nd}$ slot configuration determined in accordance with the propagation delay value,
- wherein each of the $1^{st}$ slot configuration and the $2^{nd}$ slot configuration includes a start symbol and an end symbol determined in consideration of the propagation delay value, respectively.

8. The method of claim 7, wherein the $1^{st}$ node comprises a base station and wherein the $2^{nd}$ node comprises a mobile relay node.

9. The method of claim 8, wherein if subframe boundaries of the $1^{st}$ and $2^{nd}$ nodes are aligned with each other, the start symbol of the $1^{st}$ slot configuration is determined using the propagation delay value, a guard interval and the number of symbols occupied by a control information transmitted to a user equipment from the $2^{nd}$ node and wherein the end symbol of the $2^{nd}$ slot configuration is determined using the propagation delay value and the guard interval.

10. The method of claim 8, wherein if subframe boundaries of the $1^{st}$ and $2^{nd}$ nodes are not aligned with each other, the start symbol of the $1^{st}$ slot configuration is determined using the propagation delay value, a guard interval, the number of symbols occupied by a control information transmitted to a user equipment from the $2^{nd}$ node and a difference value between the subframe boundary of the $1^{st}$ node and the subframe boundary of the $2^{nd}$ node and wherein the end symbol of the $2^{nd}$ slot configuration is determined using the propagation delay value, the guard interval and the difference value between the subframe boundary of the $1^{st}$ node and the subframe boundary of the $2^{nd}$ node.

11. The method of claim 7, further comprising the step of receiving the determined $1^{st}$ slot configuration and the determined $2^{nd}$ slot configuration from the $1^{st}$ node.

12. In a mobile communication system, an apparatus for transmitting a signal to a node, the apparatus comprising:
- a transmitting module; and
- a processor controlling the apparatus including the transmitting module, the processor receiving, from the node, a propagation delay value between the apparatus and the node; determining a $1^{st}$ slot configuration and a $2^{nd}$ slot configuration in accordance with the propagation delay value; and transmitting the signal through a subframe having a structure determined according to the $1^{st}$ slot configuration and the $2^{nd}$ slot configuration,
- wherein each of the $1^{st}$ slot configuration and the $2^{nd}$ slot configuration includes a start symbol and an end symbol determined in consideration of the propagation delay value, respectively.

13. In a mobile communication system, an apparatus for receiving a signal from a node, the apparatus comprising;
- a receiving module; and
- a processor controlling the apparatus including the receiving module, the processor transmitting, to the node, a propagation delay value between the node and the apparatus; and receiving the signal through a subframe having a structure determined according to a $1^{st}$ slot configuration and a $2^{nd}$ slot configuration determined in accordance with the propagation delay value,
- wherein each of the $1^{st}$ slot configuration and the $2^{nd}$ slot configuration includes a start symbol and an end symbol determined in consideration of the propagation delay value, respectively.

* * * * *